Figure 3:
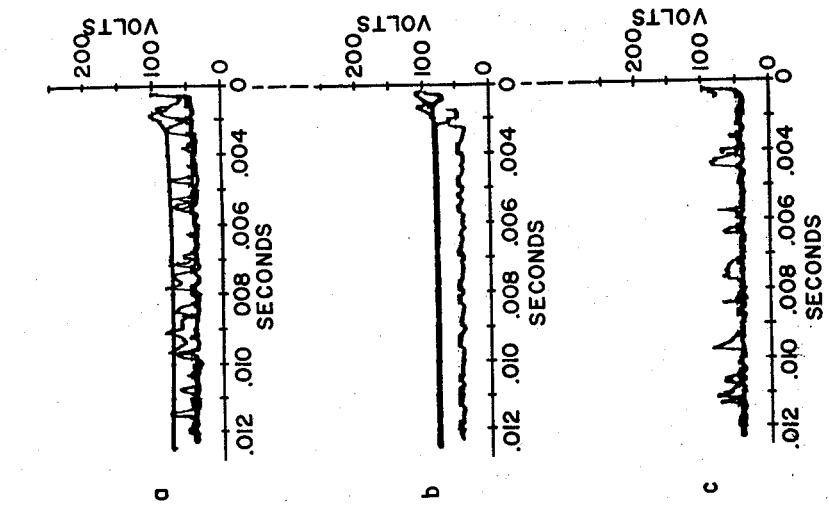

March 17, 1964 M. REBUFFONI ETAL 3,125,703
ARC WELDING AND CUTTING APPARATUS UTILIZING POLYPHASE
A.C. SUPPLIED THROUGH SILICON-DIOXIDE RECTIFIER
Filed April 5, 1960 4 Sheets-Sheet 1

United States Patent Office 3,125,703
Patented Mar. 17, 1964

3,125,703
ARC WELDING AND CUTTING APPARATUS UTILIZING POLYPHASE A.C. SUPPLIED THROUGH SILICON-DIOXIDE RECTIFIER
Martin Rebuffoni and Emil F. Steinert, Williamsville, N.Y., assignors to Westinghouse Electric Corporation, East Pittsburgh, Pa., a corporation of Pennsylvania
Filed Apr. 5, 1960, Ser. No. 20,137
5 Claims. (Cl. 315—201)

This invention relates to the art of fabricating by means of electric arcs and has particular relationship to arc welding, cutting, gouging or scarfing or the like. While this invention is peculiarly suitable for arc welding, cutting, gouging and scarfing, in its broader aspects, it may be suitable for arc melting. To the extent of such suitability the use of this invention in arc melting is intended to fall within the scope of this application and the reference in the claims of this application to "arc welding" is intended to include arc melting within its scope. The reference to "cutting" in the claims is also intended to include within its scope gouging and scarfing and the like to the extent applicable. In the interest of economy the desirability has arisen of carrying out arc welding, cutting, gouging and scarfing with static arc-producing apparatus of the direct current type. Such apparatus includes a transformer which is connected to a commercial alternating current supply and a rectifier bridge or bridges, of the silicon-diode type. The expression "silicon-diode type" or like expressions are herein intended to mean low-forward-resistance, high-back-resistance dry rectifiers such as those composed of silicon and germanium and like elements.

In welding with static apparatus of this type an arc is fired between an electrode and the work and the electrode or a filler material is melted by the heat of the arc and deposited on the work or the work itself is fused by the heat of the arc to produce a joint. In cutting, gouging or scarfing an arc is fired between an electrode and the work and compressed air or other gas moving at a high velocity is projected against the molten pool at the work to effectuate the material removal. Apparatus capable of supplying between 200 and 1000 amperes direct current may conveniently be used for cutting, gouging or scarfing purposes.

In attempting to cut, gouge or scarf with prior art static direct-current apparatus excessive failure of the static apparatus has been encountered and it is an object of this invention to provide static direct-current arc-producing apparatus of the silicon-diode type which shall lend itself, without failing excessively, to arc cutting, gouging or scarfing where a compressed air stream is projected against the molten pool.

This invention in its broader aspects arises from the discovery that the failure of the prior art static arc-producing apparatus results from the failure of the silicon-diodes and that this failure results from the impressing of high back potentials across the diodes. It has been found that the gas (air) projected against the pool causes the arc to operate highly irregularly and to produce frequent high voltage incidences. Because of the high back-resistance of the silicon-diodes the full high voltages which thus appear between the electrode and the work are impressed across the diodes in the back direction and damage the diodes. In rectifiers of the selenium type this potential across cells would be lower because of the lower back resistance of the selenium cells. Thus static apparatus of the selenium cell type might not manifest this phenomenon to the same degree but apparatus of the silicon-diode type has marked advantages over apparatus of the selenium type.

In accordance with this invention in one of its broader aspects, a capacitor having a high effective capacitance is connected between the direct current output terminals of the rectifier bridge. For apparatus capable of delivering between 200 and 1000 amperes for cutting, gouging or scarfing this capacitor should have a capacity of the order of 2000 microfarads. It has been found that such a capacitor reduces the peak voltages which occur from 200 or more volts to no more than 125 volts. The peak voltages may be further reduced by increased capacitance. With a capacitor of 4000 microfarads between the output terminals of the bridge the peak voltages are reduced to 110 volts. The capacitor may be of the electrolytic type. The reduction in peak voltages thus effected substantially eliminates the failure of diodes and thus preserves the arc-producing apparatus.

But the high capacitance between the output terminals of the arc-producing apparatus has been found to militate against the use of the apparatus both for welding and cutting, gouging, or scarfing. While the apparatus is satisfactory for cutting, gouging or scarfing it does not operate satisfactorily for welding and it is another object of this invention to provide static apparatus which shall serve both for welding and for cutting, gouging and scarfing with a gas blast against the molten pool.

The aspect of this invention involving the multiple purpose apparatus arises from the discovery that the capacitor may tend to extinguish the arc during operation. Initially before an arc is struck the capacitor is charged. When the electrode and the work are brought into contact to strike the arc, the capacitor discharges through the electrode and the work. The discharged capacitor is then in effect a short-circuit across the electrode and the work and may divert power flow to such an extent as to extinguish the arc or prevent ignition or refiring of the arc.

In accordance with this invention the continuity of the welding arc is preserved by inserting a small but effective resistance in series with the capacitor across the output terminals of the bridge. In the case of a 200 to 1000 ampere welder with a 200 microfarad capacitor connected to the output terminals of the bridge the resistor should have a resistance of the order of one-half ohm. It has been found that a static direct current arc-producing apparatus with a half-ohm resistor and a 2000 microfarad capacitor between the output terminals of a silicon-diode bridge may be used highly effectively both for welding and for cutting, gouging and scarfing. In addition the resistor serves the additional purpose of protecting the capacitors, which usually are electrolytic and have a low current carrying capacity from overload.

Figure 2:
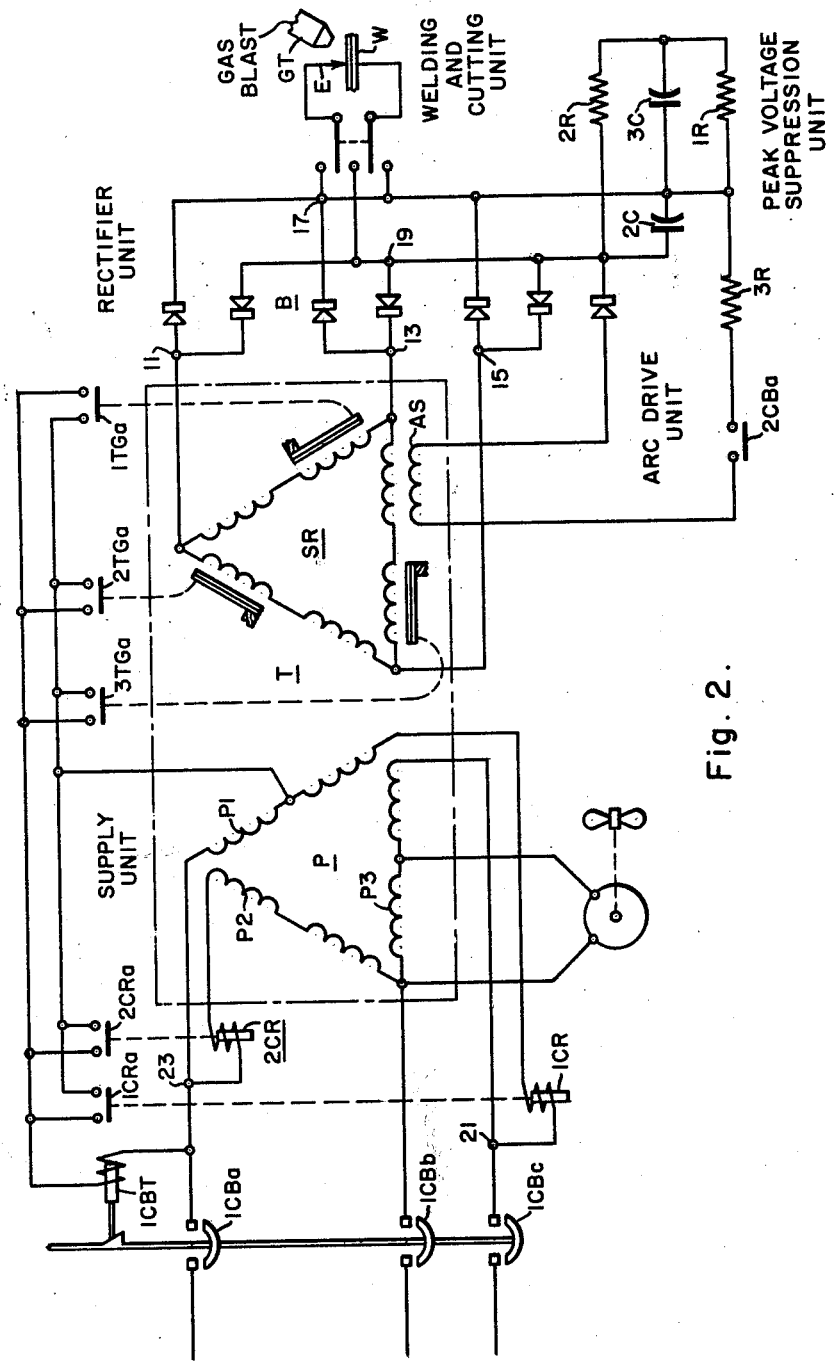
Figure 5:
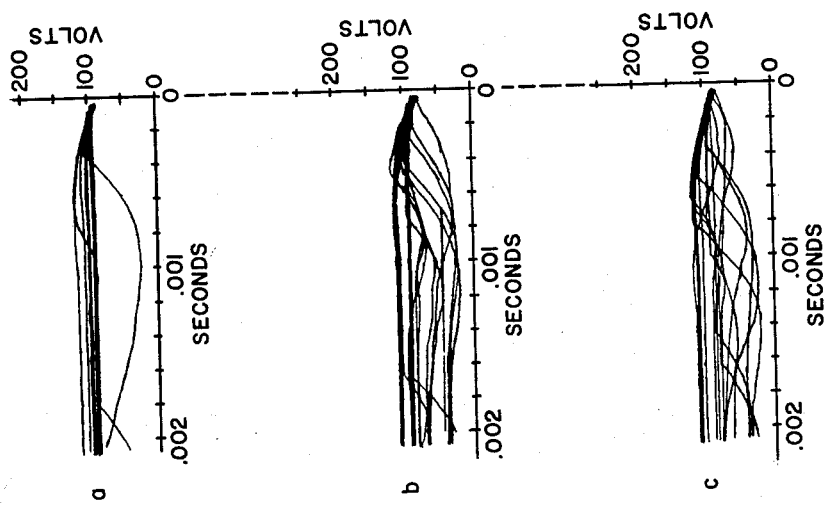
Figure 4:
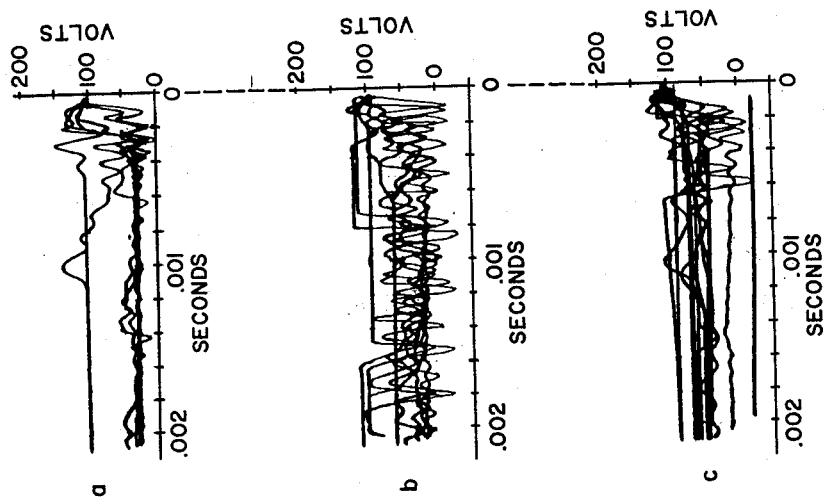
Figure 7:
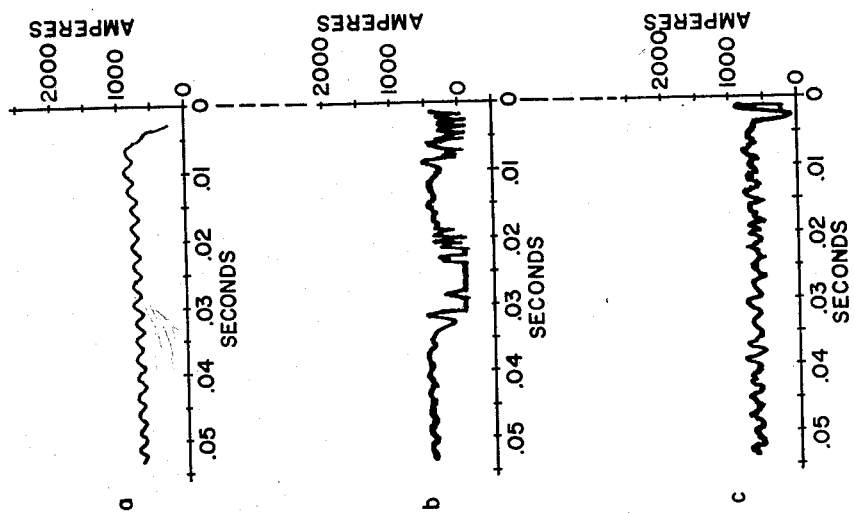
Figure 6:
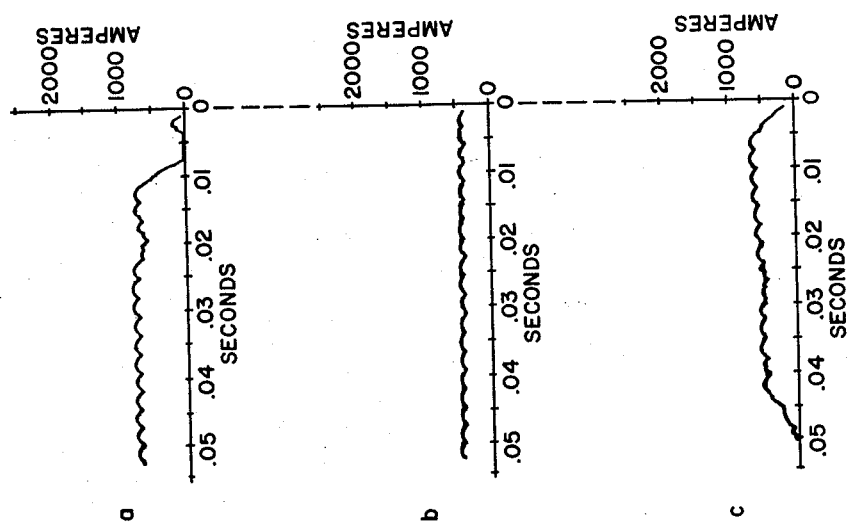

The novel features considered characteristic of this invention are disclosed generally above. The invention itself both as to its organization and as to its method of operation together with additional objects and advantages thereof will be understood from the following description of a specific embodiment taken in connection with the accompanying drawings, in which:

FIGS. 1a, b, c are photographs of the voltage traces on a cathode ray oscilloscope produced in the actual operation of cutting, gouging and scarfing apparatus in accordance with the teachings of the prior art;

FIG. 2 is a schematic of a preferred embodiment of this invention;

FIGS. 3a, b, c are photographs of the voltage traces on a cathode ray oscilloscope produced during an actual cutting operation with apparatus in accordance with this invention with a high effective capacity in series with a low but effective resistance across the output terminals of the arc-producing apparatus;

FIGS. 4a, b, c are photographs of the voltage traces on a cathode ray scope produced during an actual cutting operation with apparatus in which a capacitor of low capacity is connected between the output terminals of direct current arc-producing apparatus;

FIGS. 5a, b, c are photographs of the voltage traces on a cathode ray scope taken during the actual cutting operation with apparatus in accordance with this invention in which only a high effective capacity is connected between the output terminals of this apparatus;

FIGS. 6a, b, c are photographs of the voltage trace on a cathode ray scope during an actual cutting operation with prior art apparatus; and FIGS. 7a, b, c are photographs of the current traces on a cathode ray scope during an actual cutting operation with apparatus in accordance with this invention in which only a high effective capacitor is connected across the output terminals of the arc-producing apparatus.

FIGS. 2a, b, c, and 3a, b, c through 7a, b, c were taken at random times during a few milliseconds of operation of the scope. The maximum peaks which some of these photographs show are not necessarily the highest peaks to which the diodes were subjected.

FIGS. 1a, b, c were taken during a cutting operation carried out with three Westinghouse RA welders of the silicon-diode type each having a 300-ampere rating connected in parallel and supplying about 750 amperes. The load voltage measured both at the output of the welders and at the arc was about 40 to 50 volts. The cables to the arc were about No. 4/0 and 50 ft. long. The cutting was carried out with a one-half inch diameter copper-coated carbon electrode.

Figure 1:
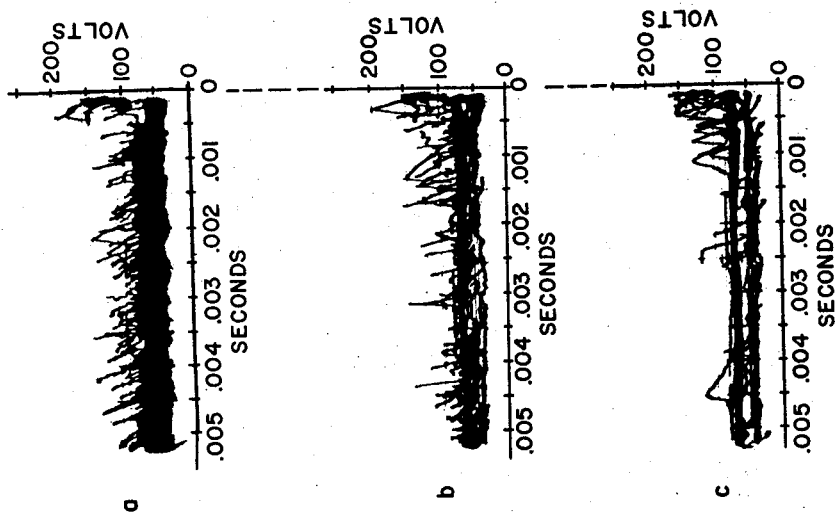

In FIG. 1 voltage across the arc is plotted vertically and time horizontally. The photographs show that the voltage is highly variable and may rise at least to 200 volts. This would tend to damage the diodes.

The apparatus shown in FIG. 2 includes a Welding and Cutting Unit, a Rectifier Unit, Supply Unit, an Arc-Drive Unit, and a Peak Voltage Suppressor Unit. While this invention is applicable to arc-producing apparatus of many types it is here shown, for the purpose of facilitating the explanation of this invention, as embodied in a Westinghouse WS welder of the silicon-diode type such as is disclosed in Patents Nos. 2,965,805, granted December 20, 1960, to Emil F. Steinert, and 3,058,031, granted October 9, 1962 to Emil F. Steinert, Martin Rebuffoni, Lewis F. Pettit, Jr. and Gordon E. Cossaboom both entitled "Arc-Welding Apparatus."

The Welding and Cutting Unit includes an electrode E and work W. Where the cutting is of the gas-blast type, gas at a high velocity is projected against the molten pool in the work through a tube GT. The tube GT may be a hole in the electrode or in the electrode holder.

The Rectifier Unit includes a bridge B made up of silicon-diodes and having input terminals 11, 13, 15 and positive and negative output terminals 17 and 19 respectively. The terminals 17 and 19 are connected through a reversing switch SW to the electrode E and the work W. A capacitor 2C of relatively small capacity (5 microfarads usually) is connected between terminals 17 and 19 to suppress the irregular voltage variations (back) between these terminals.

The Supply Unit includes a polyphase transformer T having a primary P, a secondary reactor SR and an auxiliary secondary AS. The primary P and the secondary reactor are connected in delta. The primary P has windings P1, P2, P3. The Primary P1 is connected to an apex 21 of the delta through a protective relay 1CR and the primary P2 is similarly connected to an apex 23 through a protective relay 2CR.

The Supply Unit is energized from conductors 1L1, 1L2 and 1L3. The conductors 1L1, 1L2, 1L3 are energized from the buses (not shown) of a commercial supply through the contacts 1CBa, 1CBb, 1CBc, respectively of a circuit breaker having a trip coil 1CBT which trips the breaker open when energized. The coil 1CBT is adapted to be connected between conductors 1L1 and 1L3 through any one of the contacts 1CRa or 2CRa of the relays 1CR or 2CR or the contacts 1TGa, 2TGa, 3TGa, of thermal elements (not shown) embedded in each of the secondary reactor windings.

The Arc-Drive Unit includes the secondary AS. The secondary AS is connected across the terminals 17 and 19 of the bridge B through a silicon-diode D, a resistor 3R and a contact 2CBa of a circuit breaker 2CB (mechanism not shown) which is preferably of the Westinghouse AB type and which trips when the current in the Arc-Drive Unit exceeds between 35 and 40 amperes.

The Peak Voltage Suppression Unit includes a capacitor 3C having a high effective capacitance (2000 microfarads usually although 4000 or 6000 microfarads is sometimes used) and a resistor 2R having a low effective resistance (usually about one-half ohm for each 2000 microfarads capacity). The capacitor 3C is shunted by a bleeder resistor 1R (usually about 500 ohms). This resistor is desirable but not indispensable in the practice of the invention. The capacitor 3C and resistor 2R are connected in series between the output terminals 17 and 19 of bridge B.

In using the apparatus just described for welding or cutting, gouging or scarfing an arc is struck between the electrode E and the work W and the welding or cutting, gouging or scarfing carried out by the heat of the arc. The irregularities in the arc potential introduced by the gas-blast are suppressed by the capacitor 3C and there are substantially no diode failures. The resistor 2R prevents the capacitor 3C from introducing irregularities and instabilities during welding and protects the capacitor 3C against overload.

It has been found that the apparatus disclosed herein may operate without damage to the diodes in situations in which the reactance of the secondary reactor SR is very high. This has happened recently in apparatus provided for use with a 25 cycle commercial supply. In such apparatus the inductance of the secondary reactor must be more than twice the inductance for apparatus energized from a 60 cycle supply. This high inductance was found to produce a voltage surge of several hundred volts which damaged the diodes. This damage was eliminated by including a Peak Voltage Suppression Unit as just described in the apparatus.

The photographs in FIGS. 3a, b, c were taken with apparatus in accordance with this invention including a duplex 500–1000 ampere Westinghouse RA welder during a normal cutting operation. The welder delivered 600 amperes D.C. at the common terminals of bridges B. The electrode E was connected to the welder through two No. 4/0 cables 20 ft. long in parallel and to the work through one such cable. Two 2000 microfarad electrolyte capacitors (3C) each with a one-half ohm resistor (2R) in series were connected across the output terminals (17 and 19) of the bridge (B). The capacitor (3C) current during cutting was found to be 10 to 12 amperes with the resistor (2R) in the circuit. With the resistors (2R) removed and the capacitors (3C) connected directly across the output terminals the capacitor current was found to be about 75 amperes. This reveals the extent to which the series resistor 2R protects the capacitor 3C.

In FIGS. 3a, b, c voltage is plotted vertically and time horizontally. FIGS. 3a, b, c show the extent to which the voltage across the arc is reduced in the practice of this invention.

FIGS. 4a, b, c are photographs of voltage traces like FIGS. 3a, b, c, but with only 15 microfarads directly across the output terminals of the apparatus. These photographs were taken during normal cutting with the same apparatus as that used in taking FIGS. 1a, b, c except for the 15 microfarad capacitor. The photographs show that high voltage surges were present. FIGS. 5a, b, c are photographs of voltage traces taken during normal arc cutting with the same apparatus as for FIGS. 4a, b, c, but with three capacitors each of 2000 microfarads of capacitance connected in parallel across the output terminals of the apparatus. The oscillograms show that high voltage incidences have been suppressed.

FIGS. 6a, b, c and 7a, b, c show current traces during normal cutting with apparatus used in producing FIGS. 4a, b, c and 5a, b, c. In making FIGS. 6a, b, c there was no capacity across the output terminals of the apparatus; for FIGS. 7a, b, c there were three capacitors in parallel each of 2000 microfarads.

While a preferred embodiment of this invention has been disclosed herein many modifications thereof are feasible. This invention then is not to be restricted except insofar as is necessitated by the spirit of the prior art.

We claim as our invention:

1. Arc welding and cutting apparatus for arc welding and cutting work with an electrode, by means of an arc between said work and said electrode, which arc produces a molten pool at said work, and particularly for cutting said work with a blast of gas directed against said molten pool, said apparatus comprising conductors for supplying polyphase alternating current, electrode and work conductors to be connected to said electrode and work respectively, rectifier means of the silicon-diode type connected in rectifying relationship between said supplying conductors and said electrode and work conductors for supplying direct current to said electrode and work conductors, said rectifier means being dimensioned to supply direct current having a magnitude of the order of 200 to 1000 amperes between said electrode and work, and capacitive means having a capacitance of the order of 2000 microfarads connected in a symmetrically conductive shunt circuit between said electrode and work conductors.

2. Apparatus both for arc-welding work and for arc cutting work with an electrode by means of an arc produced between said work and said electrode which arc produces a molten pool at said work, and particularly apparatus both for arc welding work and for arc cutting work with a carbon electrode and with a blast of gas directed against said molten pool, said apparatus comprising means for supplying polyphase alternating current, rectifier means of the silicon-diode type connected in rectifying relationship with said supplying means and having output terminals from which direct current is derivable, means connected to said terminals for connecting said terminals to said electrode and work, said rectifier means being dimensioned to supply direct current having a magnitude of the order of 200 to 1000 amperes to the arc between said electrode and work, and capacitive means having a large and effective capacitance and resistive means having a small but effective resistance connected in series in a symmetrically conductive circuit between said terminals.

3. Apparatus both for arc welding work and for arc cutting work with an electrode by means of an arc produced between said work and said electrode, said arc producing a molten pool at said work, and particularly apparatus both for arc welding work and for arc cutting work with a carbon electrode and with a blast of gas directed against said molten pool the said apparatus comprising means for supplying polyphase alternating current, rectifier means of the silicon-diode type connected in rectifying relationship with said supplying means and having output terminals from which direct current is derivable, means connected to said terminals for connecting said terminals to said electrode and work, said rectifier means being dimensioned to supply direct current having a magnitude of the order of 200 to 1000 amperes to the arc between said electrode and work, and capacitive means having a capacitance of the order of 2000 microfarads and resistive means having a resistance of the order of one-half ohm connected in series in a symmetrically conductive circuit between said terminals.

4. Apparatus both for arc-welding work and for arc cutting work with an electrode by means of an arc produced between said work and said electrode which arc produces a molten pool at said work, and particularly apparatus both for arc welding work and for arc cutting work with a carbon electrode and with a blast of gas directed against said molten pool, said apparatus comprising means for supplying polyphase alternating current, rectifier means of the silicon-diode type connected in rectifying relationship with said supplying means and having output terminals from which direct current is derivable, means connected to said terminals for connecting said terminals to said electrode and work, said rectifier means being dimensioned to supply direct current having a magnitude of the order of 200 to 1000 amperes to the arc between said electrode and work, and capacitive means having a large and effective capacitance connected in series in a symmetrically conductive circuit between said terminals.

5. Arc welding and cutting apparatus for arc welding and cutting work with an electrode, by means of an arc between said work and said electrode, which arc produces a molten pool at said work, and particularly for cutting said work with a blast of gas directed against said molten pool, said apparatus comprising conductors for supplying polyphase alternating current, electrode and work conductors to be connected to said electrode and work respectively, inductive reactance means, rectifier means of the silicon-diode type connected through said reactance means in rectifying relationship between said supplying conductors and said electrode and work conductors for supplying direct current to said electrode and work conductors, said reactance means being in power transmitting relationship with said rectifier means and storing energy during current conducting intervals which is dissipated on the interruption of current flow through said reactance means and rectifier means, said rectifier means being dimensioned to supply direct current having a magnitude of the order of 200 to 1000 amperes between said electrode and work, and capacitive means having a capacitance of the order of 2000 microfarads connected in a symmetrically conductive shunt circuit between said electrode and work conductors.

References Cited in the file of this patent

UNITED STATES PATENTS

| | | |
|---|---|---|
| 2,238,625 | Cox | Apr. 15, 1941 |
| 2,426,054 | Rose | Aug. 19, 1947 |
| 2,969,494 | Davis | Jan. 24, 1961 |

OTHER REFERENCES

Corbyn and Potter: "Characteristics and Protection of Semiconductor Rectifiers," Institution of Elec. Engineers Proceedings, Part A, vol. 107, 1960, pages 255–272 (Paper No. 3135, November 1959).